Patented Oct. 8, 1929

1,730,681

UNITED STATES PATENT OFFICE

DANIEL L. OGDEN AND ROGER E. VALENTINE, OF WOODBRIDGE, NEW JERSEY, ASSIGNORS TO UNITED STATES METALS REFINING COMPANY, OF CARTERET, NEW JERSEY, A CORPORATION OF NEW JERSEY

PROCESS OF RECOVERING SELENIUM

No Drawing. Application filed May 9, 1928. Serial No. 276,499.

This invention provides an improved method for the production of selenium (Se) from solutions containing this element, in the form of selenious acid or salts of selenious acid. In the roasting and smelting of ores, mattes, flue dust and other metallurgical products, and in the smelting of slimes resulting from the electrolytic refining of metals, selenium when present is volatilized in the form of selenium dioxide, which is recovered by water absorption in the form of selenious acid ($H_2SeO_3$) and by condensation in the flues as selenium dioxide crystals, colloquially known as "whiskers". Selenious acid is formed when these crystals are dissolved in water and when the soda slags, made during the smelting and refining of electrolytic slimes mentioned before, are leached with water. Up to the time of our invention selenium has been obtained from the selenious acid by adding hydrochloric acid (HClAq) to the solution to keep it acid sufficiently to prevent the tellurium, which is usually present, from also precipitating, and then passing sulphur dioxide (made by burning sulphur—brimstone) through this acidified solution to precipitate the selenium. It was necessary to keep the solution as cool as possible and to pass the $SO_2$ through slowly, as otherwise the precipitate would occlude sulphuric acid causing trouble later on, and possibly come down as a purplish-black modification of selenium which is very hard to wash free from acid and to dry. The red amorphous form of selenium produced when the conditions were right was then washed carefully by decantation until free from sulphuric and hydrochloric acids, after which it was heated with live steam to bring to the boiling temperature whereby the red amorphous was changed to the black amorphous. (During the washing serious losses of selenium often occurred.) This black selenium was then filtered off, dried, ground, screened and packed for shipment.

The present invention provides a simpler, more rapid, and more economical process, whereby the production of black amorphous selenium is greatly facilitated.

By the new method the sump pit solution or other selenium-bearing solution containing selenium in the form of selenious acid is kept hot while introducing $SO_2$ (preferably commercial liquid $SO_2$) and without adding hydrochloric acid to the solution; thereby black amorphous selenium is precipitated in lumps or granules. When the reaction has been completed, the precipitate is repeatedly washed with water, either hot or cold, to remove any residual acid; the lumpy precipitate is then ground while wet, using for this purpose preferably a continuous ball or rod mill. The ground material is then washed, filtered, and dried. The dried product requires only screening, nearly all of it passing through a suitably fine screen, whereupon it may be packed for shipment.

An important feature of differentiation from the former process is that the solution is worked hot instead of cold, and that no hydrochloric acid is added or is present, and the selenium is thus precipitated immediately in the black amorphous form instead of first producing red amorphous selenium and afterward converting this into the black form. The black amorphous precipitate occurs in the form of lumps, balls, or masses containing occluded acid and liquid, and cannot practicably be immediately dried and ground; instead, the new process requires that this black amorphous precipitate be crushed and ground in wet condition while washing out the liberated acid and other liquid impurities.

The process, as operated on a practical scale, is more completely described as follows:

The sump pit solution which has washed the exhaust gases from the flue or tower contains selenium in the form of selenious acid and its salts, with a trace of selenic acid; or if the solution results from leaching of soda slag, it should be acidulated, preferably by adding sulphuric acid. Such solutions require ordinarily to be filtered to make them ready for treatment. The solution is placed in a suitable tank and treated while hot, or if the solution has cooled it should be heated to about 180° F. and maintained at approximately that temperature during treatment.

The tank should be provided with an agitator, whereby the solution may be kept in agitation during treatment.

When the tank has been filled with the filtered solution the agitator is started and solution raised to the required temperature and sulphur dioxide passed into the solution so that the gas will bubble up through it. The heat of reaction will rapidly raise the temperature to 180° to 190° F. and maintain this temperature without the aid of external heat. The addition of $SO_2$ is continued until the solution shows by chemical test that all of the selenium has been precipitated; thereupon the introduction of $SO_2$ is cut off and the agitation stopped. The solution is then allowed to settle and the liquor is decanted from the precipitate. The precipitated selenium is then washed two or more times by adding water and agitation and decantation. The precipitate is then washed over onto a gravity filter, from which the wet precipitate is transferred to a wet mill for grinding. A suitable grinding mill is a continuous feed and overflow mill, either a ball mill or rod mill. Water is kept flowing through the mill, the overflow running onto a suction filter of standard design equipped for washing the filter cake. This washing removes any soluble impurities which may have dissolved in the acid occluded in the precipitate and released by the breaking up of the latter during grinding. The washed filter cake which is selenium is then removed to pans and placed in an oven for drying, which is conducted at a temperature not over 200° F. The dried selenium is then screened and packed for shipment. It is found that nearly all of the dried material will pass through a screen of 180–200 mesh.

The time required (using agitator tanks holding about 100 cubic feet) is about three to six hours for the agitation with sulphur dioxide; subsequent washing in the agitator and emptying, three to four hours; grinding, two to four hours; finally washing, about two hours; and drying and packing, 24 to 48 hours.

The selenium produced by this process is found to have a purity approximating 99 per cent.

The new process has the advantages of more than doubling the capacity of existing plants without additional labor; the selenium product is as pure as that heretofore commercially produced; the time required by the entire process is shortened to less than one-half that formerly needed and the waste of selenium is greatly reduced due to hot precipitation and subsequent wet grinding; the use of hydrochloric acid (HClAq) is avoided, and less care and skill in the conduct of the process are required.

It is to be understood that the detailed description of the preferred manner of conducting the process is given for the information of workers as to the best mode known to us for practising the invention; and the detailed steps described are not to be taken as essential features thereof.

We claim as our invention:

1. The treatment of a hot selenium-bearing solution by introduction of sulphur dioxide in absence of hydrochloric acid to precipitate selenium in black amorphous form; separating the solution; grinding the wet precipitate; and washing and drying the selenium.

2. Treating a hot selenium-bearing solution with agitation and introduction of sulphur dioxide to precipitate selenium in black amorphous form.

3. Producing black amorphous selenium by direct precipitation from a hot solution containing selenious acid or salts.

4. Producing selenium by direct precipitation from a solution containing selenious acid of black amorphous selenium and continuously crushing and washing the precipitate to remove occluded acid and soluble impurities.

5. Treating a hot selenium-bearing solution with agitation and introduction of sulphur dioxide to precipitate black amorphous selenium with absence of hydrochloric acid.

In witness whereof, we have hereunto signed our names.

DANIEL L. OGDEN.
ROGER E. VALENTINE.